Dec. 20, 1938.    A. H. NICHOLSON    2,141,013
GLASS CONTAINER
Filed June 5, 1937

INVENTOR.
Albert H. Nicholson.
BY
ATTORNEYS.

Patented Dec. 20, 1938

2,141,013

UNITED STATES PATENT OFFICE 2,141,013

GLASS CONTAINER

Albert H. Nicholson, Columbus, Ohio, assignor to The Federal Glass Company, Columbus, Ohio, a corporation of Ohio Application June 5, 1937, Serial No. 146,650

3 Claims. (Cl. 65—59)

My invention relates to glass containers. It has to do, more particularly, with glass containers of the type embodying a body portion and a removable lid resting on the upper end thereof, such as refrigerator dishes.

Ordinarily this type of glass container embodying a body portion and a removable lid resting on the upper edge thereof, is so constructed that the lid is slightly larger than the upper end of the body portion so that the lid will project outwardly from the side wall of the body portion all around the body portion. It has been necessary to construct the container in this manner in order that the projecting portion of the lid could be gripped so as to remove the lid from the container. However, the projecting portion of the lid detracts from the appearance of the container and has other disadvantages.

One of the objects of my invention is to provide a container of the type indicated, such as a refrigerator dish, the container embodying a body portion having a removable lid resting on the upper end thereof, the edge of the lid being flush with the side wall of the container so as to enhance the appearance thereof.

Another object of my invention is to provide a container of the type indicated wherein the edge of the lid is substantially flush with the side wall of the container and which is provided with simple, efficient and attractive means by which the lid may be readily gripped with the fingers in order to remove it from the container.

The preferred embodiment of my invention is illustrated in the accompanying drawing wherein similar characters of reference designate corresponding parts and wherein.

Figure 1:
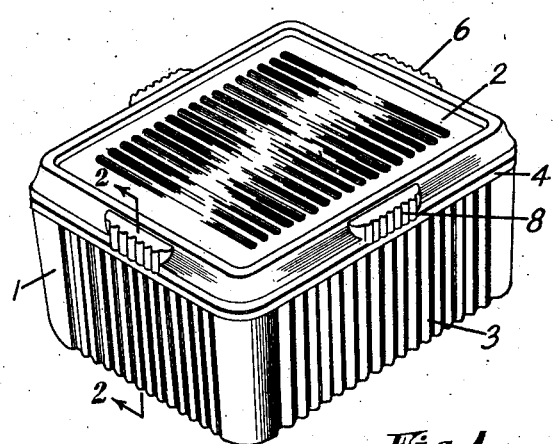
Figure 1 is a perspective view of a container made in accordance with my invention.

With reference to the drawing, I have illustrated a glass container of the type commonly known as a covered refrigerator dish. This container embodies a body portion 1 of substantially rectangular cross-section having a lid 2 resting on the upper end thereof. It is to be understood that the shape and the appearance of the container do not have any bearing on this invention other than that with my invention it is possible to make the container of very pleasing appearance. The body portion has a plurality of vertical ribs 3 formed on the outer surface of the side wall, although such surface may be a plane surface. The upper end of the side wall has a continuous rib or shoulder 4 formed thereon. The lid 2 merely rests on the upper edge of the body portion and is provided with a shoulder 5 which is disposed within the side wall of the body portion and will maintain the lid in position on the body portion. It will be noted from Figures 1 and 4 that the edge of the lid is bevelled and extends downwardly and outwardly and its outermost point will be flush with the outer surface of the shoulder or rib 4. The lid will not project outwardly beyond the shoulder. This will give the container a more pleasing appearance.

In order to facilitate removal of the lid from the upper end of the container I provide four lugs 6 which are formed on the bevelled edge of the lid. These lugs are arranged in pairs, the lugs of each pair being disposed directly opposite each other. They are formed integral with the lid. Of course, it will be understood that only two of the lugs could be provided if desired.

Figure 2:
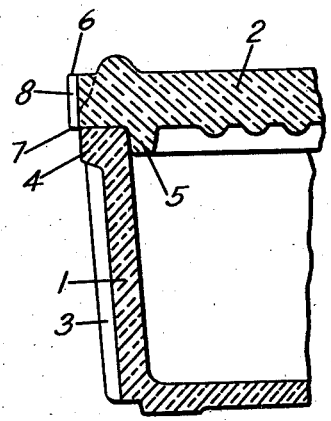
Figure 2 is a vertical section taken substantially along line 2—2 of Figure 1.
Figure 3:
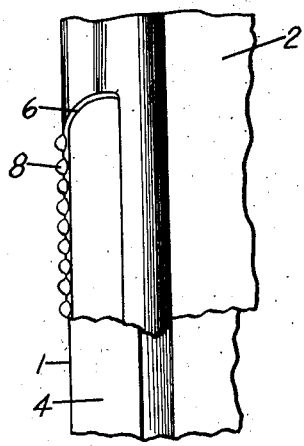
Figure 3 is a top view showing the gripping means which I provide to facilitate removal of the lid.

As indicated in the drawing, and particularly in Figure 2, the lugs are so arranged that they project outwardly from the bevelled edge of the lid and have a vertically disposed outer surface. They project outwardly slightly beyond the rib or shoulder 4 as indicated at 7 and beyond the outermost point of the edge of the lid. A plurality of notches 8 are formed in the outer surface of the lugs to enhance the appearance thereof and also to form a rough surface thereon which will facilitate gripping of the lugs by the fingers. These lugs project sufficiently beyond the outer surface of the shoulder 4 to permit them to be readily gripped but because the notches 8 are formed therein they do not appear to project beyond the shoulder 4 to any extent. The notches 8 extend inwardly to a point substantially flush with the outer surface of the shoulder 4 and the outer surface of the edge of the lid which is flush with the shoulder 4. However, it is to be understood that the surface of each lug may be plane and need not necessarily be rough or figured as indicated.

Figure 4:
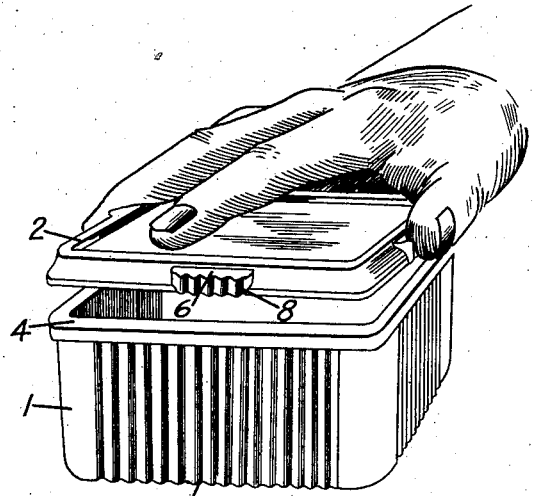
Figure 4 is a view illustrating how the gripping means may be engaged by the fingers in order to remove the lid.

It will be apparent from Figure 4 that the lugs 6 may be readily gripped with the fingers to permit removal of the lid. Thus, it is not necessary to have the lid projecting from the body portion. Consequently, the container will have a better appearance. The lugs will project a sufficient distance to permit them to be readily gripped by the fingers but they are so formed that they will not detract from the appearance of the container but, in the other hand, will add to the appearance thereof.

Having thus described my invention, what I claim is:

1. A container of the type indicated formed of glass and comprising a body portion having a removable lid resting on the upper edge thereof, said lid having its edge bevelled downwardly and outwardly with its outermost point substantially flush with the side wall of the container at its upper edge, said lid having a pair of oppositely disposed lugs integrally formed on the bevelled edge of the lid at opposite sides thereof, each of said lugs having a substantially vertically disposed outer surface which projects slightly beyond the side wall of the container at the upper edge thereof and the outermost point of the edge of the lid, said lugs being so disposed that they may be gripped by the fingers of the hand to lift the lid from the container, each of said lugs having notches formed in its outer surface to facilitate gripping thereof, each of said notches extending into the lug to a point substantially flush with the outermost point on the edge of the lid and with the side wall of the container at the upper edge thereof.

2. A container of the type indicated formed of glass and comprising a body portion having a removable lid resting on the upper edge thereof, said lid having its edge bevelled downwardly and outwardly with its outermost point substantially flush with the side wall of the container at its upper edge, said lid having a pair of oppositely disposed lugs integrally formed on the bevelled edge of the lid at opposite sides thereof, each of said lugs having a substantially vertically disposed outer surface which projects slightly beyond the side wall of the container at the upper edge thereof and the outermost point of the edge of the lid, said lugs being so disposed that they may be gripped by the fingers of the hand to lift the lid from the container.

3. A container of the type indicated formed of glass and comprising a body portion having a removable lid resting on the upper edge thereof, said lid having its edge substantially flush with the side wall of the container at its upper edge, said lid having a pair of opposite disposed lugs integrally formed on the edges of the lid at opposite sides thereof, each of said lugs having a substantially vertically disposed outer surface which projects slightly beyond the side wall of the container at the upper edge thereof and the edge of the lid, said lugs being so disposed that they may be gripped by the fingers of the hand to lift the lid from the container, each of said lugs having notches formed in its outer surface to facilitate gripping thereof, each of said notches extending into the lugs to a point substantially flush with the edge of the lid and with the side wall of the container at the upper edge thereof.

ALBERT H. NICHOLSON.